(12) United States Patent
Sadler et al.

(10) Patent No.: US 12,253,212 B2
(45) Date of Patent: Mar. 18, 2025

(54) SUPPORT STRUCTURE FOR MANUFACTURING A PRESSURE VESSEL

(71) Applicant: BAE SYSTEMS plc, London (GB)

(72) Inventors: Andrew Sadler, Barrow-in-Furness (GB); Alan Phizacklea, Barrow-in-Furness (GB); Anthony Craig Robinson, Barrow-in-Furness (GB); James William Spain, Barrow-in-Furness (GB); Adam William Rawlinson, Barrow-in-Furness (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 18/613,462

(22) Filed: Mar. 22, 2024

(65) Prior Publication Data
US 2024/0318779 A1 Sep. 26, 2024

Related U.S. Application Data

(62) Division of application No. 18/004,518, filed as application No. PCT/GB2021/051607 on Jun. 24, 2021, now Pat. No. 11,953,151.

(30) Foreign Application Priority Data

Jul. 6, 2020 (GB) .................................... 2010331

(51) Int. Cl.
*F17C 1/00* (2006.01)
(52) U.S. Cl.
CPC ........ *F17C 1/00* (2013.01); *F17C 2201/0104* (2013.01); *F17C 2209/221* (2013.01); *F17C 2209/228* (2013.01); *F17C 2209/232* (2013.01)

(58) Field of Classification Search
CPC ............. F17C 13/08; F17C 1/10; B63B 73/10
See application file for complete search history.

(56) References Cited

U.S. PATENT DOCUMENTS

| | | | |
|---|---|---|---|
| 3,220,585 A * | 11/1965 | McCartney | ............... B60P 1/02 254/8 C |
| 2018/0066796 A1 | 3/2018 | Heon et al. | |
| 2023/0250921 A1 | 8/2023 | Sadler et al. | |

FOREIGN PATENT DOCUMENTS

| CN | 110171530 A | 8/2019 |
|---|---|---|
| CN | 110260156 A | 9/2019 |

(Continued)

OTHER PUBLICATIONS

International Search Report and Written Opinion received for PCT/GB2021/051607. Mailed: Sep. 29, 2021. 14 pages.

(Continued)

*Primary Examiner* — Moshe Wilensky
(74) *Attorney, Agent, or Firm* — Finch & Maloney PLLC

(57) ABSTRACT

A support structure for manufacturing a pressure vessel, the support structure configured to be carried on a supporting substrate, the support structure comprising a first segment support structure nestable within, and moveable relative to, a second segment support structure, wherein the first segment support structure is configured to be raised and lowered relative to the second segment support structure to thereby raise and lower the first segment relative to the substrate, and the first segment support structure is configured to move between a nested position within the second segment support structure to a position spaced apart from the second segment support structure across a surface of the substrate.

18 Claims, 15 Drawing Sheets

(56) References Cited

FOREIGN PATENT DOCUMENTS

| CN | 110271639 A | 9/2019 |
|---|---|---|
| EP | 2520847 A1 | 11/2012 |
| WO | 2022008874 A1 | 1/2022 |

OTHER PUBLICATIONS

GB Search Report under Section 17(5) received for GB Application No. 2010331.3, dated Dec. 11, 2020. 4 pages.
Epic Soviet Documentaries: "How to Build a Submarine Documentary with Engish Subtitles," accessed from Internet at: https://www.youtube.com/watch?v=NrbPEe36u3E, Sep. 20, 2021. 10 pages.
Crabtree, Steve, "BAE Systems Maritime (Building of Astute Class Submarine)," accessed from Internet at: https://www.youtube.com/watch?v=pf6QRofXQWU, Sep. 20, 2021. 4 pages.

* cited by examiner

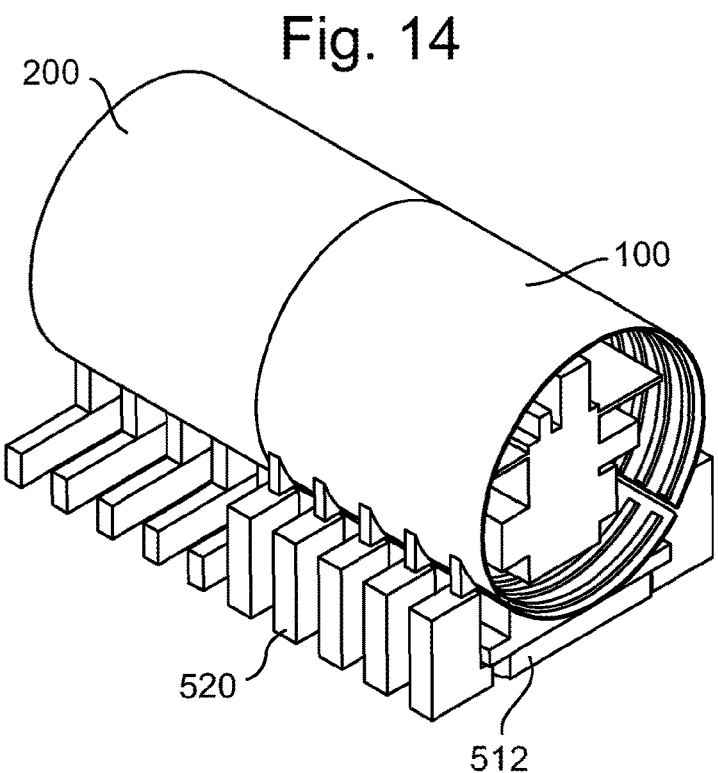
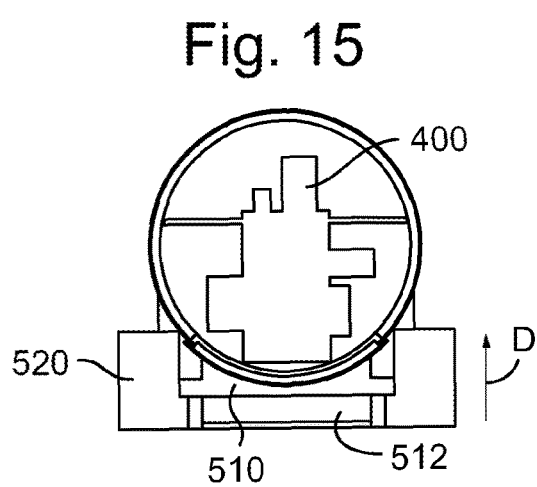
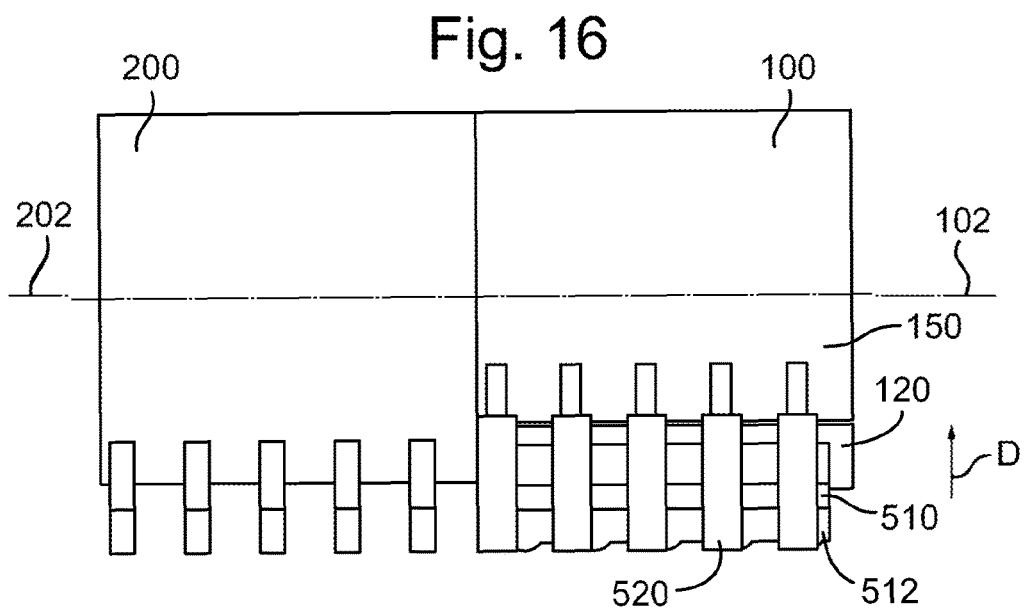

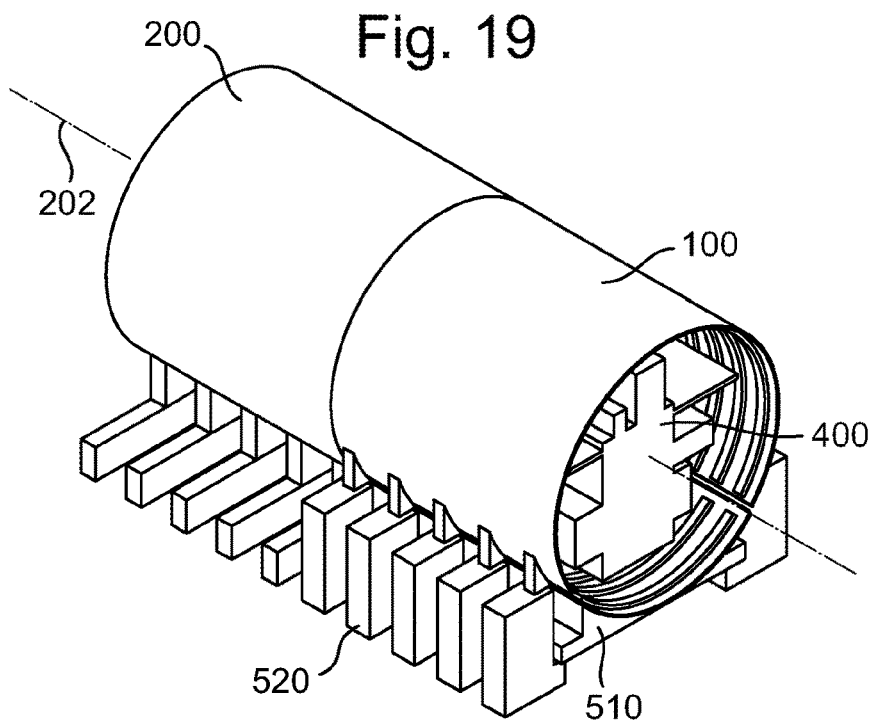
Fig. 19
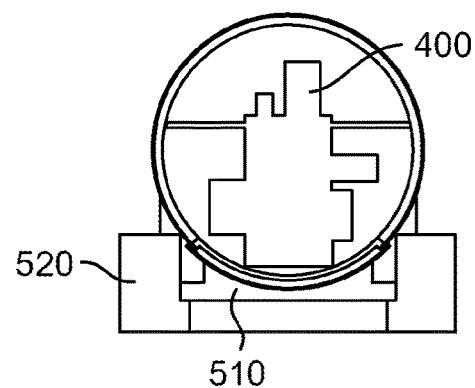
Fig. 20
Fig. 21
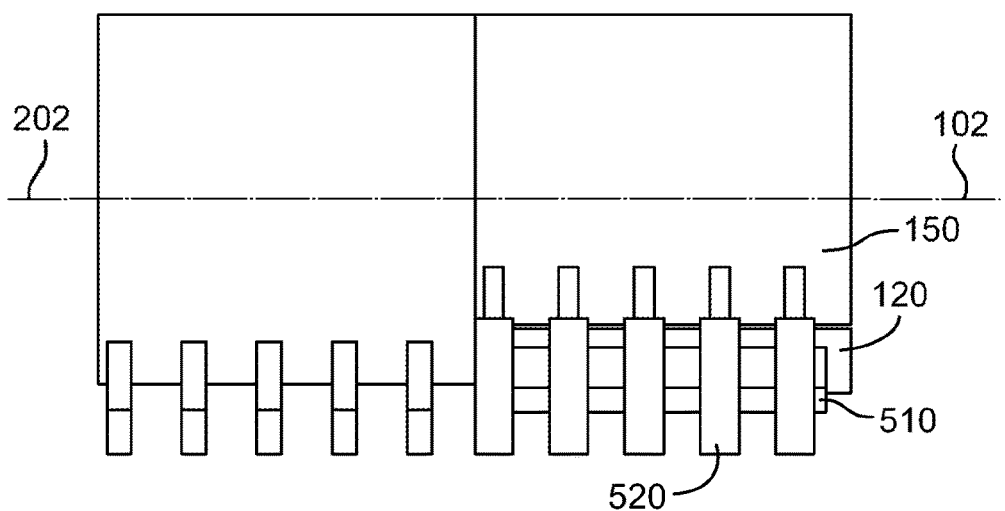

SUPPORT STRUCTURE FOR MANUFACTURING A PRESSURE VESSEL

RELATED APPLICATIONS

This application is a divisional of U.S. patent application Ser. No. 18/004,518, filed Jan. 6, 2023, titled "A METHOD OF MANUFACTURING A PRESSURE VESSEL", which claims priority to PCT/GB2021/051607, filed Jun. 24, 2021, which in turn claims priority to GB 2010331.3, filed Jul. 6, 2020, the content of each of which is hereby incorporated by reference in its entirety.

FIELD OF THE DISCLOSURE

The present disclosure relates to a method of manufacturing a pressure vessel.

In particular the disclosure is concerned with a method of manufacturing a pressure vessel, a support structure for use during the method of manufacturing and a pressure vessel.

BACKGROUND

In heavy engineering applications, manufacture of large and heavy pressure vessels may require the joining of different sections to form the desired length and volume of vessel. Since the walls of the vessel will have to withstand large forces due to pressure exerted thereon, the sections are often substantially tubular, that is to say with a continuous wall, open at both ends.

Often it is required to install apparatus (for example a power plant, pumps, tanks) which are themselves large and heavy. Installing such apparatus is difficult since access by crane may be limited or impossible, and other lifting equipment (for example forklift trucks) may not have adequate capacity.

Even if the apparatus can be lifted into position, some require a degree of commissioning to ensure they are operating correctly. This may be very difficult to do in the enclosed space inside the pressure vessel, and may require the provision of significant additional equipment and personnel to ensure safe working practices are adhered to. Even if this is possible, other construction may need to be put on hold while the commissioning is carried out, thereby extending the manufacturing time.

Hence a method of manufacture of a pressure vessel within which apparatus must be fitted, which can be done with reduced risk and quicker than examples of the related art, is highly desirable.

SUMMARY

According to the present disclosure there is provided a method and apparatus as set forth in the appended claims. Other features of the invention will be apparent from the dependent claims, and the description which follows.

Accordingly there may be provided a method of manufacturing a pressure vessel (10). The pressure vessel may comprise a first section (100) having a longitudinal axis (102). The first section (100) may comprise a wall (104) which extends around the longitudinal axis (102) to define the boundary of a first sub-chamber (106). The first section (100) may have a first end (108) spaced apart from a second end (110) along the longitudinal axis (102), the first section (100) being open at the first end (108) to define a first opening to the first sub-chamber (106). The first section (100) may be open at the second end (110) to define a second opening to the first sub-chamber (106). The method may comprise the steps of dividing the wall (104) into a first segment (120) and a second segment (150). The first segment (120) of the wall (104) may extend from the first end (108) to the second end (110), and have edges (122, 124) extending from the first end (108) to the second end (110), separating the first segment (120) from the second segment (150) such that second segment (150) of the wall (104) is provided with longitudinally extending edges (132, 134) extending from the first end (108) to the second end (110), spaced apart by a gap (136). The method may further comprise the step of fitting apparatus (400) onto the first segment (120). The method may also comprise the step of re-attaching the first segment (120) and the second segment (150) by re-locating the first segment (120) in the gap (136) defined by the edges (132, 134) of the second segment (150) and joining the first segment (120) and second segment (150) along their edges (122, 124; 132, 134) so the apparatus (400) is housed within the first sub-chamber (106).

The method may further comprise the step of joining the first section (100) to a second section (200). The first end (108) of the first section (100) may be joined to a first end (208) of the second section (200). The second section may have a longitudinal axis (202). The second section (200) may comprise a wall (204) which extends around the longitudinal axis (202) to define the boundary of a second sub-chamber (206), the first end (208) of the second section (200) being spaced apart from a second end (210) along the longitudinal axis (202), the second section (200) being open at the first end (208) to define a first opening to the second sub-chamber (206).

The method may further comprise the step of joining the second section (200) to the second segment (150) of the first section (100) before the first segment (120) is re-attached to the second segment (150). The first segment (120) may then be joined to the first end (208) of the second section (200).

The method may further comprise the step of joining the first section (100) to a third section (300). The second end (110) of the first section (100) may be joined to a first end (308) of the third section (300). The third section (300) may have a longitudinal axis (302). The third section (300) may comprise a wall (304) which extends around the longitudinal axis (302) to define the boundary of a third sub-chamber (306), the first end (308) of the third section (300) being spaced apart from a second end (310) along the longitudinal axis (302), the third section (300) being open at the first end (308) to define a first opening to the third sub-chamber (306).

The method may further comprise the step of joining the third section (300) to the first segment (120) of the first section (100) before the first segment (120) is re-attached to the second segment (150). The second segment (150) may then be joined to the first end (308) of third section (300).

The method may further comprise the step of providing a support structure (500) to support the first segment (120) independently of the second segment (150).

The method may further comprise the step of providing a support structure (500) comprising a first segment (120) support structure (510) and a second segment (150) support structure (520), wherein the first segment (120) support structure (510) is moveable relative to the second segment (150) support structure (520) such that the first segment (120) is moveable away from the second segment (150) with the first segment (120) support structure (510).

The step of separating the first segment (120) from the second segment (150) may include the steps of first moving the first segment (120) in a direction perpendicular to, and away from, the longitudinal axis (102) until the edges (122, 124) of the first segment (120) are spaced apart from the edges (122, 124) of the second segment (150); then moving the first segment (120) in direction parallel to the longitudinal axis (102) away from the second segment (150).

The step of re-joining the first segment (120) and second segment (150) may include the steps of first moving the second first segment (120) in direction parallel to the longitudinal axis (102) towards the second segment (150); then moving the first segment (120) in a direction perpendicular to, and towards the longitudinal axis (102) until the edges (122, 124) of the first segment (120) are located with the edges (132, 134) of the second segment (150).

There may also be provided a support structure (500) for manufacturing a pressure vessel (10).

The support structure (500) may be configured to be carried on a supporting substrate (600).

The support structure (500) may comprise a first segment (120) support structure (510) nestable within a second segment (150) support structure (520). The first segment (120) support structure (510) may be operable to raise the first segment (120) away from and towards the substrate. The first segment (120) support structure (510) may be operable to move from a nested position within the second segment (150) support structure (520) along a surface of the substrate (600) to a position spaced apart from the second segment (150) support structure (520).

The support structure (500) may comprise a first segment (120) support structure (510) nestable within, and moveable relative to, a second segment (150) support structure (520). The first segment (120) support structure (510) may be configured to be raised and lowered relative to the second segment (150) support structure (520) to thereby raise and lower the first segment (120) relative to the substrate (600). The first segment (120) support structure (510) may be configured to move between a nested position within the second segment (150) support structure (520) to a position spaced apart from the second segment (150) support structure (520) across a surface of the substrate (600).

There may also be provided a pressure vessel manufactured by the method of the present disclosure and/or using the support structure of the present disclosure.

Hence there is provided a method of manufacture of a pressure vessel which houses apparatus, where, because a section of the pressure vessel is taken apart and then reassembled with the apparatus in place on one of the segments of the section, the method may be executed with reduced risk and quicker than examples of the related art.

BRIEF DESCRIPTION OF THE DRAWINGS

Examples of the present disclosure will now be described with reference to the accompanying drawings, in which:

FIGS. 14, 15, 16 show a perspective view, end view and side view respectively of the sections and support structure of FIGS. 9, 10 during a further stage of manufacture according to the present disclosure;

FIGS. 19, 20, 21 show a perspective view, end view and side view respectively of the sections and support structure of FIGS. 14, 15, 16 during a further stage of manufacture according to the present disclosure;

DETAILED DESCRIPTION

The present disclosure relates to a method of manufacturing, a support structure and a pressure vessel manufactured by the method and/or using the support structure of the present disclosure.

The method of manufacturing relates to the production of large and heavy pressure vessels 10. That is to say the method, support structure and apparatus are appropriate for heavy engineering applications. The method of assembly and according to the present disclosure is illustrated with reference to FIGS. 1 to 34, as set out below.

Figure 1:
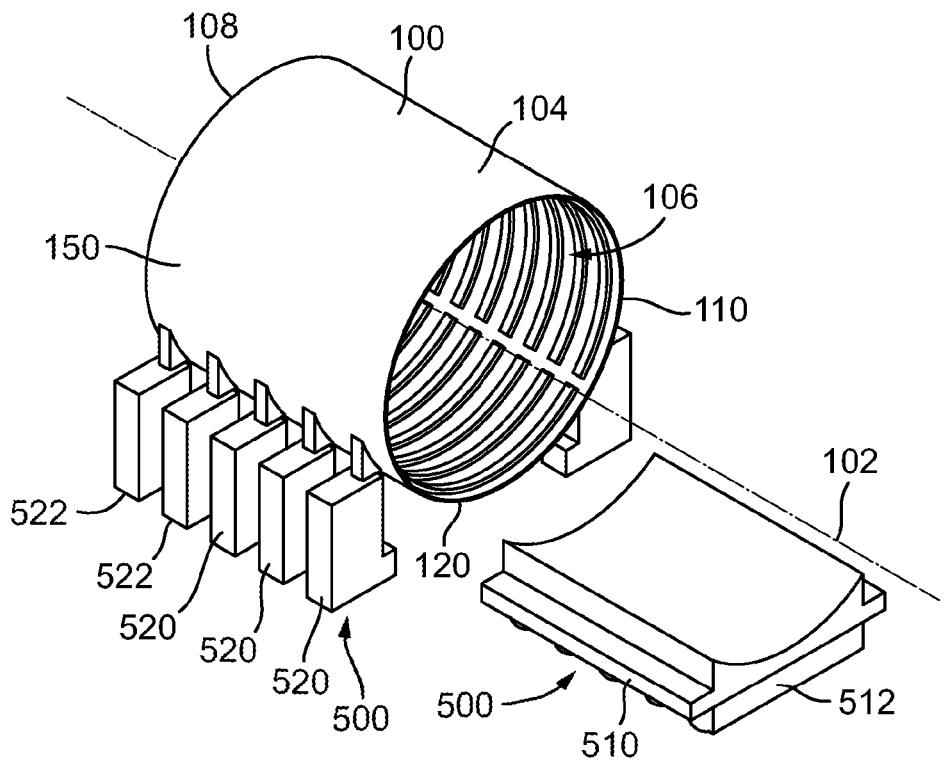
FIGS. 1, 2 show a perspective view and side view respectively of a first section of a pressure vessel and its support structure during a stage of manufacture according to the present disclosure.
Figure 2:
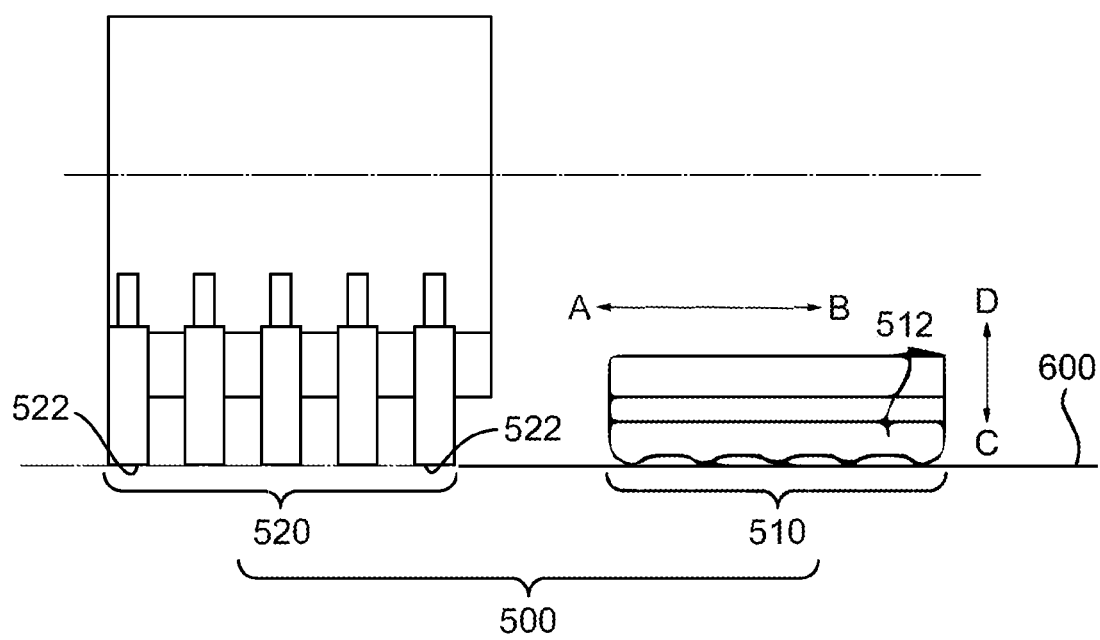

FIGS. 1, 2 shows a part of the pressure vessel 10, comprising a first section 100 having a longitudinal axis 102 supported on a support structure 500. The first section 100 comprises a wall 104 which extends around the longitudinal axis 102 to define the boundary of a first sub-chamber 106. The first section 100 has a first end 108, defined by an edge of the wall 104, spaced apart from a second end 110 along the longitudinal axis 102. The first section 100 is open at the first end 108 to define a first opening to the first sub-chamber 106. The first section 100 is also open at the second end 110 to define a second opening to the first sub-chamber 106.

As will be described, the wall 104 will be divided into a first segment 120 and a second segment 150, which are then re-joined later in the process. The support structure 500 is configured to be carried on a supporting substrate 600 (for example a ground or floor of a manufacturing and assembly area in a factory. The support structure 500 comprises a first segment 120 support structure 510 nestable within, and moveable relative to, a second segment 150 support structure 520. That is to say, the first segment 120 support structure 510 may fit within the second segment 150 support structure 520. Put another way, the first segment 120 support structure 510 may fit within side walls/supports of the second segment 150 support structure 520.

Hence the method may comprise the step of providing the support structure 500 to support the first segment 120 independently of the second segment 150. The method may further comprise the step of providing the support structure 500 comprising the first segment 120 support structure 510 and the second segment support structure 520, wherein the first segment 120 support structure 510 is moveable relative to the second segment support structure 520 such that the first segment 120 may be displaced away from and toward the second segment 150 by the first segment 120 support structure 510.

Hence, the support structure 500 may be configured to be carried on the supporting substrate 600, and the support structure 500 may comprise the first segment 120 support structure 510 nestable within, and moveable relative to, the second segment 150 support structure 520.

The support unit 510 may be slidable along the surface of the substrate 600, for example on rails or a skid track (not shown), or on a transport unit 512. The transport unit 512 may be mounted on rails or be slidable on a skid track. That is to say, there may be provided a transport unit 512 which carries the support unit 510, and which is moveable along/across the substrate 600.

The first segment 120 support structure 510 is configured and operable to move from a nested position within the second segment 150 support structure 520 along a surface of the substrate to a position spaced apart from the second segment 150 support structure 520 (i.e. in a direction B parallel to the longitudinal axis 102, as shown in FIG. 2). The first segment 120 support structure 510 is also operable to move from a position spaced apart from the second segment 150 support structure 520 to a nested position within the second segment 150 support structure 520 along a surface of the substrate to (i.e. in a direction A parallel to the longitudinal axis 102, as shown in FIG. 2).

That is to say, the first segment 120 support structure 510 may be configured to move between a nested position within the second segment 150 support structure 520 to a position spaced apart from the second segment 150 support structure 520 across a surface of the substrate 600 (i.e. in directions A, B parallel to the longitudinal axis 102, as shown in FIG. 2).

The first segment 120 support structure 510 is also configured and operable to raise the first segment 120 away from the substrate 600 (i.e. in a direction C perpendicular to the longitudinal axis 102, as shown in FIG. 2). The first segment 120 support structure 510 is operable to lower the first segment 120 towards the substrate 600 (i.e. in a direction D perpendicular to the longitudinal axis 102, as shown in FIG. 2).

That is to say, the first segment 120 support structure 510 may be configured to be raised and lowered relative to the second segment 150 support structure 520 to thereby raise and lower the first segment 120 relative to the substrate 600 (i.e. in directions C, D perpendicular to the longitudinal axis 102, as shown in FIG. 2).

The transport unit 512 (where present) may be operable to raise and lower the first segment 120 support structure 510 relative to the second segment 150 support structure 520 to thereby raise and lower the first segment 120 relative to the substrate 600 (i.e. in directions C, D perpendicular to the longitudinal axis 102, as shown in FIG. 2).

Alternatively or additionally jacks may be provided to raise and lower the first segment 120 support structure 510 relative to the second segment 150 support structure 520 to thereby raise and lower the first segment 120 relative to the substrate 600 (i.e. in directions C, D perpendicular to the longitudinal axis 102, as shown in FIG. 2).

The support structure 510 (or jig) for the first segment 120 may be provided as a solid block (i.e. with a surface which contacts substantially all of the surface of the first segment), or may be provided as a series of arched plates spaced apart along the length of the first segment 120.

The support structure 520 for the second segment 150 may comprise a series of support members 522 which may be temporary (i.e. just used for a few stages of the manufacturing process) or be final stands (i.e. used for more stages of manufacture than that of the present disclosure). Likewise the support structure 510 for the first segment 120 may comprise support members which may be temporary (i.e. just used for a few stages of the manufacturing process) or be final stands (i.e. used for more stages of manufacture than that of the present disclosure).

The configuration of the illustrated support structures 510, 520 are by way of non limiting example, and may be provided in any suitable form, with additional or fewer support members 520 and/or with bracing members (not shown) tying a number of the support members together.

Figure 3:
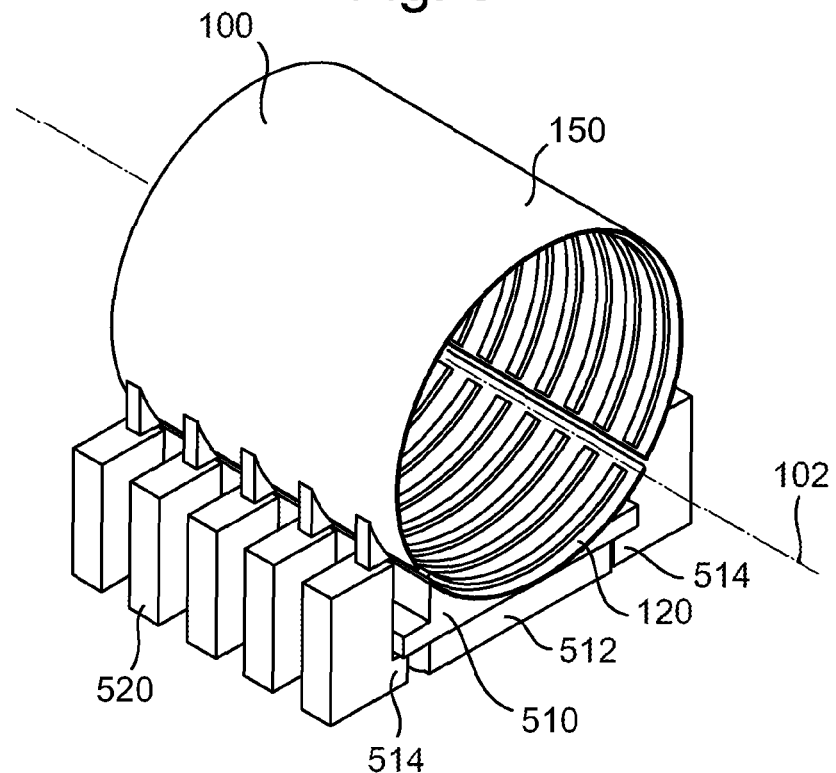
FIGS. 3, 4 show a perspective view and side view respectively of the first section and its support structure as shown in FIGS. 1, 2 during a further stage of manufacture.
Figure 4:
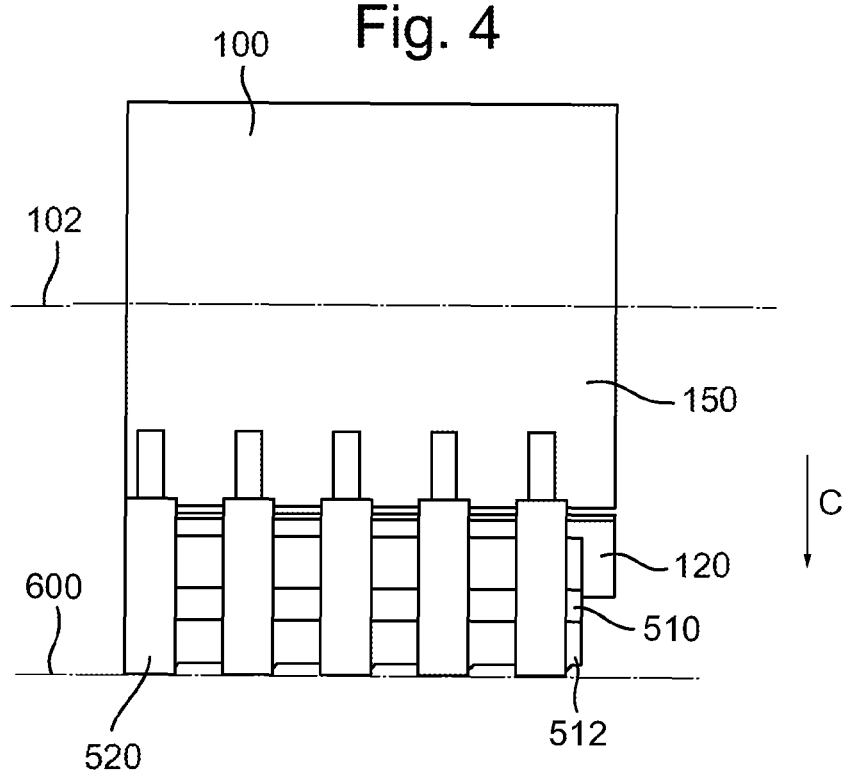

FIGS. 3, 4 show the support structure 510 for the second segment 150 positioned under the first section 100 (i.e. having been moved from a position as shown in FIG. 1 in the direction A to a nested position within the support structure 520 for the first segment 120 along a surface of the substrate 600.

The support structure 510 for the first segment 120 may be supported by the support structure 520 for the second segment 150 unit. As shown in FIG. 3, the support structure 510 for the first segment 120 may be supported off inboard edges 514 (e.g. inwardly facing shoulders 514) of the support structure 520 for the second segment 150 unit supports. The support structure 510 for the first segment 120 may alternatively or additionally sit directly on the transport unit 512 and/or be supported by jacks placed between the support structure 510 and the substrate 600 and/or the support structure 520.

The wall 104 of the first section 100 is then cut dividing the wall 104 into the first segment 120 and the second segment 150. The second segment 150 of the wall 104 is thus provided with longitudinally extending edges 132, 134 extending from the first end 108 to the second end 110, spaced apart by a gap 136. The first segment 120 of the wall 104 extends from the first end 108 to the second end 110, and has edges 122, 124 extending from the first end 108 to the second end 110.

Hence the wall 104 is cut along two lines to form the edges 122, 124 of the first segment 120 and the edges 132, 134 of the second segment 150 to thus separate (i.e. space apart) the first segment 120 from the second segment 150.

The lines/cuts may be parallel (as shown in the figures). In an alternative example the lines may converge (for example converge such that they are wider apart at the one end of the first section than they are at the other end of the first section 100.

The first segment 120 is then moved (i.e. lowered) in direction C perpendicular to, and away from, the longitudinal axis 102 until the edges 122, 124 of the first segment 120 are spaced apart from the edges 132, 134 of the second segment 150. This may be achieved by lowering the support unit 510 relative to the support unit 520 (for example by lowering the transport unit 512 and/or lowering jacks which support the support unit 510).

The first segment 120 may be at most the same size and/or mass as the second segment 150. The first segment may be no less than one fifth of the size and/or mass of the second segment 150.

Viewed in cross section, where the first segment 120 defines a portion of the total circumference of the first section 100, the first segment may be at most one half of the circumference as the first section 100. Viewed in cross section, where the first segment 120 defines a portion of the total circumference of the first section 100, the first segment may be no less than one fifth of the circumference of the first section 100.

Figure 5:
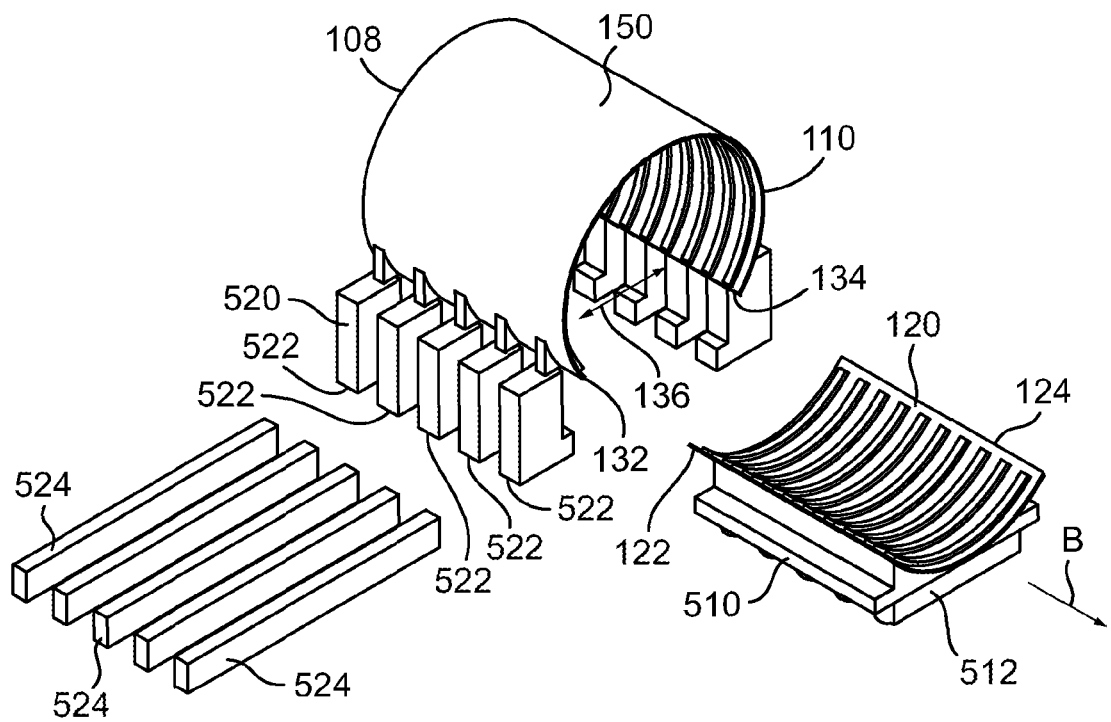
FIGS. 5, 6 show a perspective view and side view respectively of the first section and its support structure as shown in FIGS. 3, 4 during a further stage of manufacture.
Figure 6:
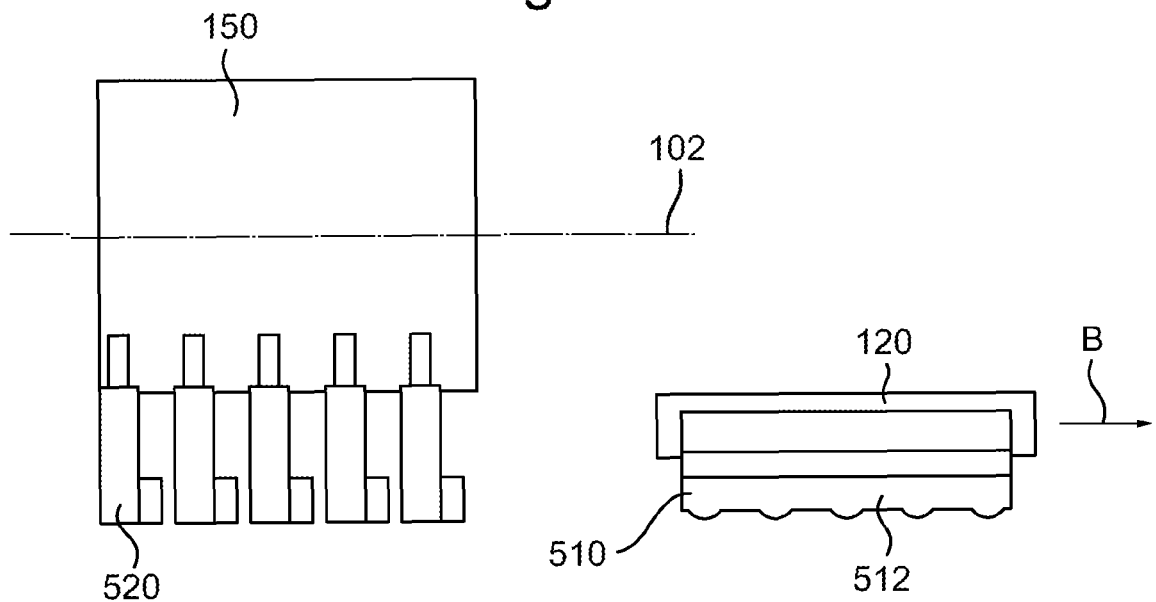

As shown in FIGS. 5, 6, the first segment 120 is then moved in a direction B parallel to the longitudinal axis 102 and away from the second segment 150. As shown, the first segment 120 may be carried on the support unit 510 (which in turn may be carried on the transport unit 512) while it is moved. Hence the support unit 510 may be moved along the surface of the substrate 600, for example supported on rails or a skid track (not shown).

Support beams 524 may be then be added to the second segment support structure 520 to join the support members 522, in order to add extra strength/rigidity to the support structure 520.

A jacking system may be used to maintain shape of the second segment 150, with the transverse beams 524 supporting the loads, and then the jacks may be locked off when the second segment has the correct shape (e.g. the correct cross-sectional shape). Weights can be hung from the top of the second segment 150 if required to correct the shape. This is important as when the first section 120 is re-attached later in the process, the second segment 150 must have the correct shape. If joined while incorrectly shaped, this could lead to distortion in the structure of the final pressure vessel 10. Thus, for example, shaping the second segment 150 is important in order to maintain circularity and alignment with other units.

Figure 7:
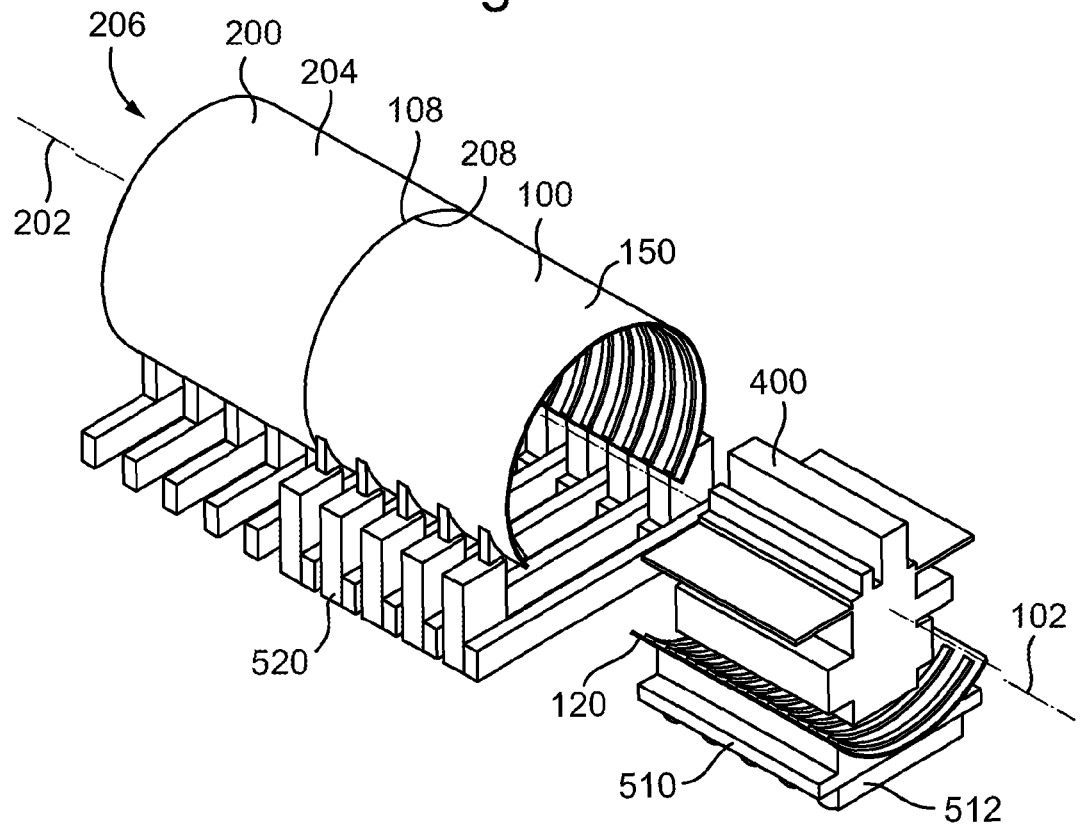
FIGS. 7, 8 show a perspective view and side view respectively of the first section and its support structure as shown in FIGS. 5, 6, with a second section and its support structure, during a further stage of manufacture.
Figure 8:
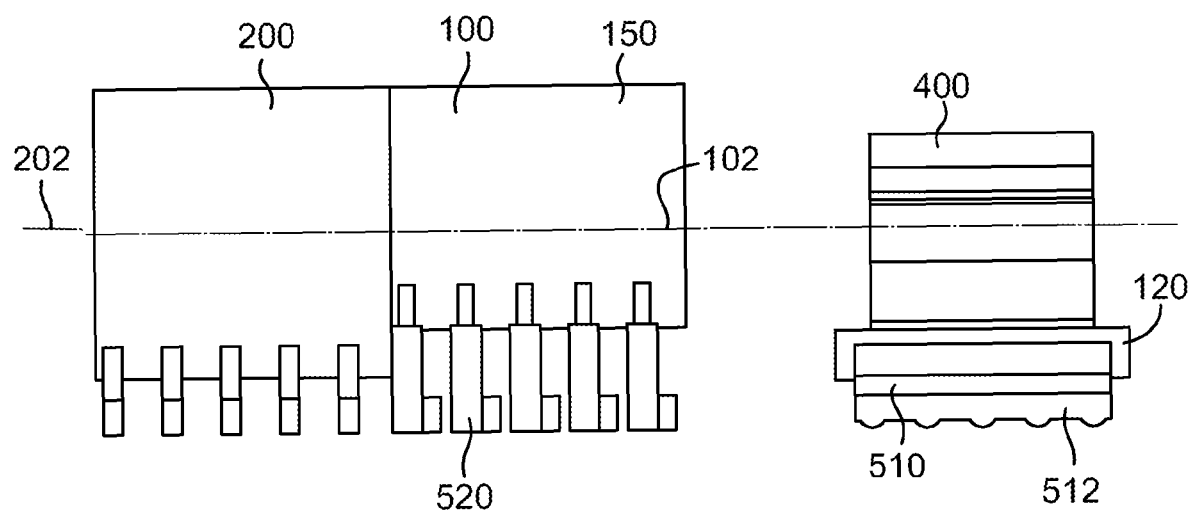

As shown in FIGS. 7, 8 apparatus 400 for the pressure vessel 10 is then fitted (for example attached, loaded or fixed) onto the first segment 120. The fitting may be a temporary fitting, which allows the apparatus to be fitted inside the pressure section 100, and then moved to a different position in the section (for example raised or lowered relative to its temporary fitting. Alternatively the fitting may the final fitting to the first segment 120. That is to say, after being fitted to the first segment 120 while the first segment is detached from the second segment 150, the apparatus is kept in same relative position relative to the first segment after the first segment 120 has been attached to the second segment 150. The apparatus may be drive equipment, for example powerplants for moving the pressure vessel. Alternatively or additionally, the apparatus may power generation equipment, for example, and electrical generator. In other examples the equipment may be air conditioning and/or air moving equipment, tanks, weights, or any other structure required to be fitted to the pressure vessel.

The method may also comprise the step of joining the first section 100 to a second section 200. Like the first section 100, the second section may have a longitudinal axis 202, and comprise a wall 204 which extends around the longitudinal axis 202 to define the boundary of a second sub-chamber 206. The second section 200 has a first end 208 defined by an edge of the wall 204 spaced apart from a second end 210 along the longitudinal axis 202 defined by another edge of the wall 204. The second section 200 may be open at the first end 208 to define a first opening to the second sub-chamber 206. The second section 200 may also be open at the second end 210 to define a second opening to the second sub-chamber 206.

The first end 108 of the first section 100 is joined (e.g. welded, bolted and/or otherwise linked and/or bonded to the first end 208 of the second section 200 such that their respective longitudinal axes 102, 202 are aligned, and such that the sub-chambers 106, 206 form a larger chamber.

The second section 200 may be supported on its own support structure, which may be of a conventional kind.

The method may comprise the step of joining the second section 200 to the second segment 150 of the first section 100 before the first segment 120 is re-attached to the second segment 150. Since the second section is in one piece (for example circular in cross-section, and not segmented) this adds extra rigidity to the second segment 150, thereby assisting with maintaining the second segment 150 in the correct shape when the first segment is re-attached. Hence, the first segment 120 may be joined to the first end 208 of the second section 200 (e.g. when the first segment 120 is attached to the second segment 150) after the second segment 150 is attached to the second section 200. This helps with ensuring the first segment 120 is attached with the correct curvature.

A step of joining the first segment 120 the first end 208 of the second section 200 may occur after the first segment 120 is re-attached to the second segment 150.

A step of joining the first segment 120 to the first end 208 of the second section 200 may occur after the second section 200 is joined to the second segment 150 of the first section 100 and before the first segment 120 is re-attached to the second segment 150.

Also, where the sections are very large, joining the first section 100 and second section 200 is advantageous as it makes the overall structure more stable and less likely to fall over. For example, this step might be requirement of health and safety practice in order to meet seismic stability requirements.

Figure 9:
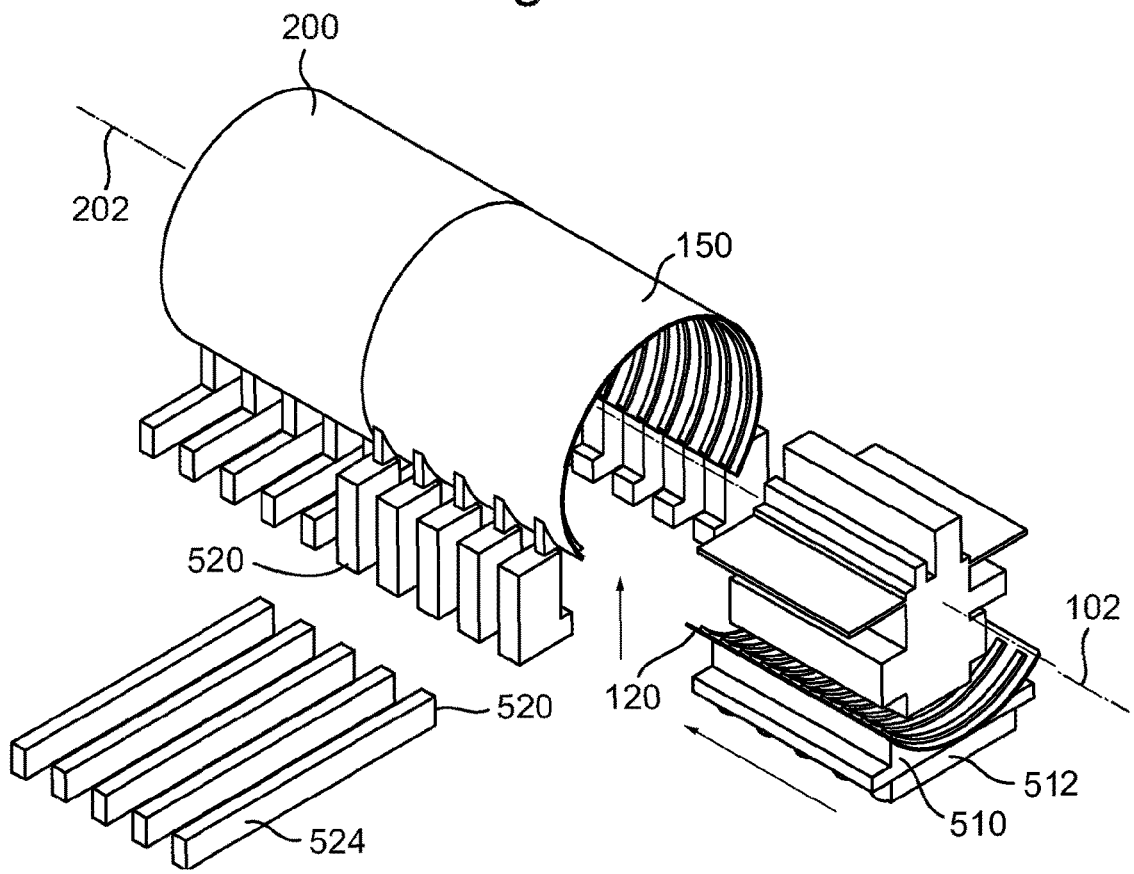
FIGS. 9, 10 show a perspective view and side view respectively of the first section and second section as shown in FIGS. 5, 6 during a further stage of manufacture.
Figure 10:
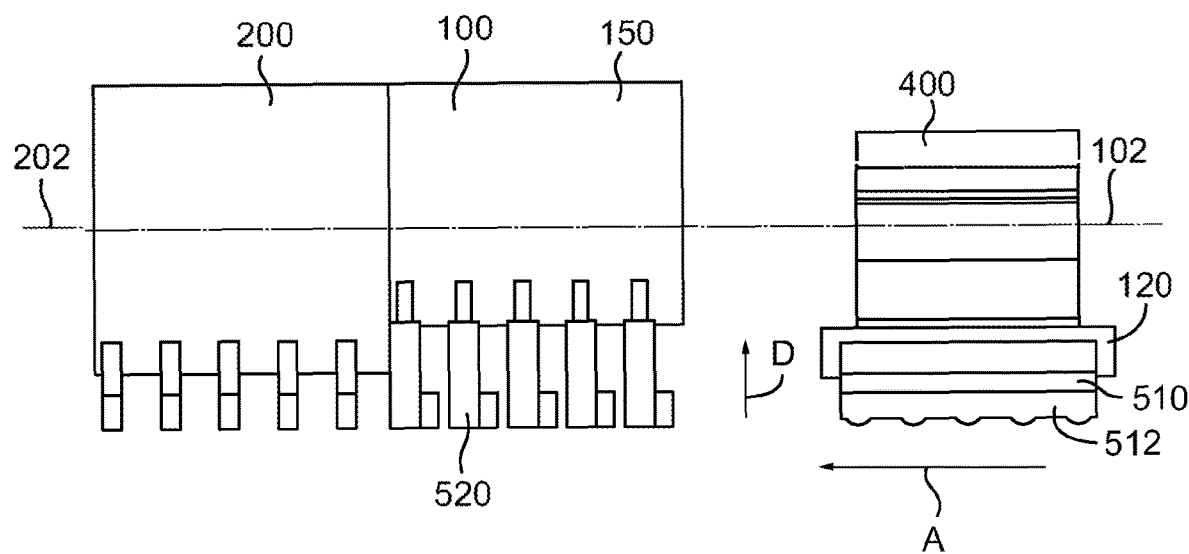

As shown in FIGS. 9, 10, once the second section 220 is joined (e.g. welded) to the first section 100, the transverse beams 524 may be removed. This is to allow space for the first segment 120 support structure 510 to move into the nested position within the second segment 150 support structure 520.

Hence the process of joining the first section 100 and second section joins up the first sub-chamber 106 and second sub-chamber 206 for form a larger chamber.

Figure 11:
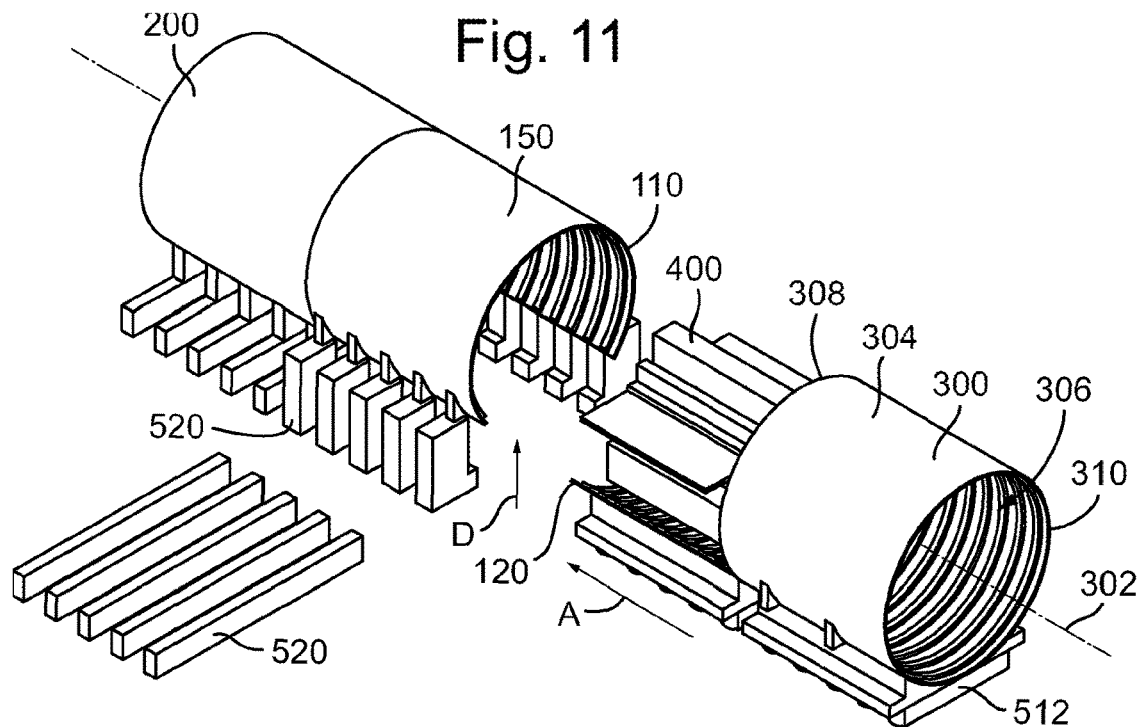
FIGS. 11, 12, 13 show a perspective view, end view and side view respectively of the pressure vessel and support structure of FIGS. 7, 8, with a third section and its supporting structure, during an alternative step according to the present disclosure compared to that shown in FIGS. 9, 10.
Figure 12:
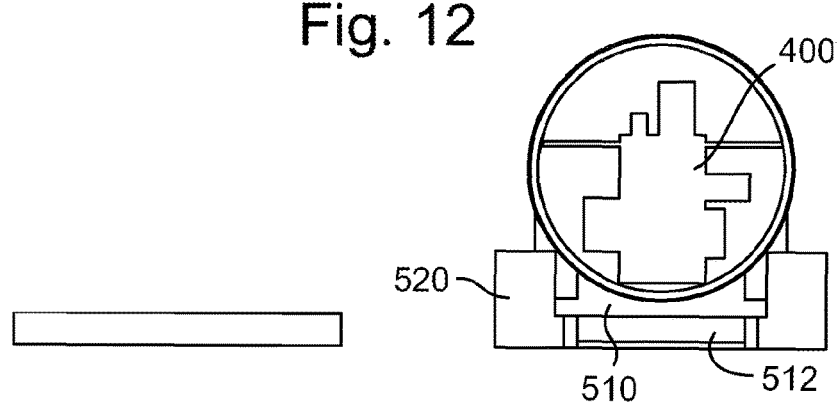
Figure 13:
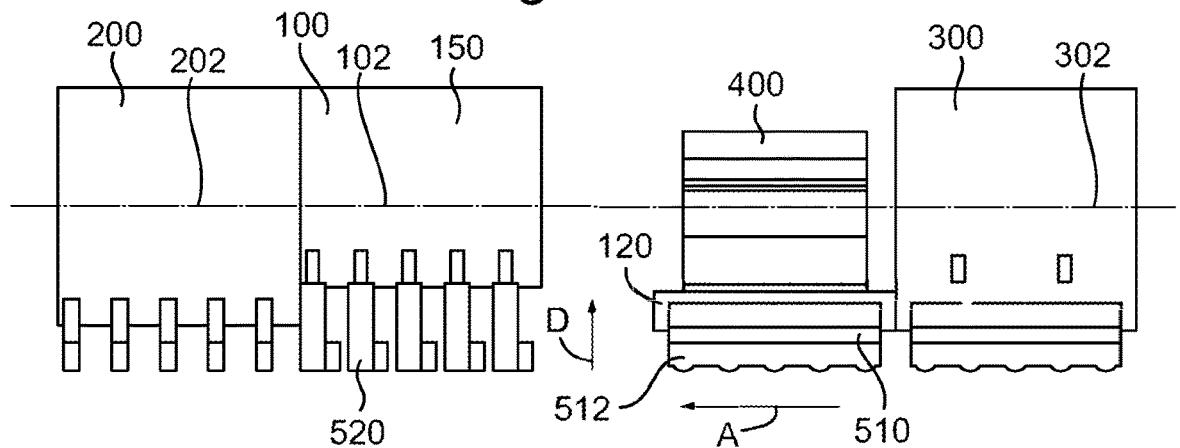
Figure 17:
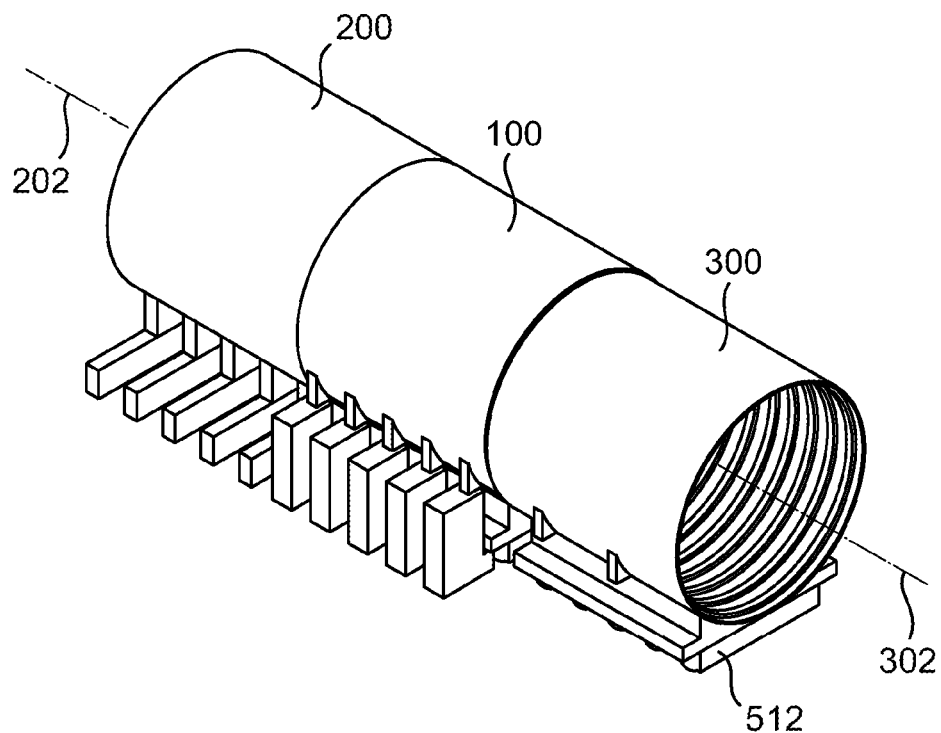
FIGS. 17, 18 show a perspective view and side view respectively of the sections and support structure of FIGS. 11, 12, 13 during a further stage of manufacture according to the present disclosure.
Figure 18:
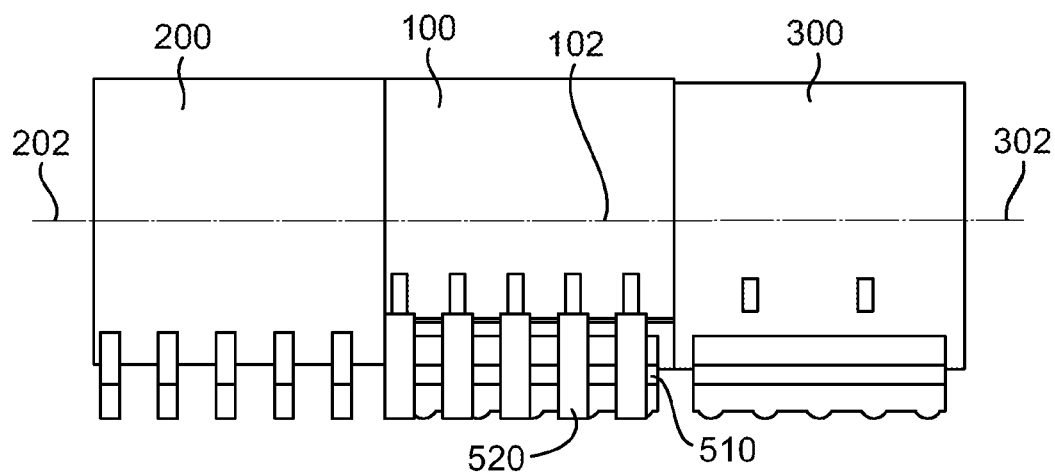

Additionally or alternatively, and as shown in FIGS. 11, 12, 13, the method may further comprise the step of joining the first section 100 to a third section 300.

Like the first section 100 and second section 200, the third section 300 may have a longitudinal axis 302, and may comprise a wall 304 which extends around the longitudinal axis 302 to define the boundary of a third sub-chamber 306.

The third section 300 may have a first end 308 defined by an edge of the wall 304 spaced apart from a second end 310 along the longitudinal axis 302. The third section 300 may be open at the first end 308 to define a first opening to the third sub-chamber 306. The third section 300 may also be open at the second end 310 to define a second opening to the third sub-chamber 306. Hence the second end 110 of the first section 100 is joined to one of the first end 308 of the third section 300 such that their respective longitudinal axes 102, 302 are aligned.

A step of joining the third section 300 to the first segment 120 of the first section 100 may occur before the first segment 120 is re-attached to the second segment 150.

A step of joining the second segment 150 to the first end 308 of the third section 300 may occur after the first segment 120 is re-attached to the second segment 150.

A step of joining the second segment 150 to the first end 308 of the third section 300 may occur after the third section 300 is joined to the first segment 120 of the first section 100 and before the first segment 120 is re-attached to the second segment 150.

As shown in FIGS. 14, 15, 16 (and FIGS. 18, 19, in examples in which the third section is attached) the step of re-joining the first segment 120 and second segment 150 includes the steps of moving the first segment 120 in a direction A parallel to the longitudinal axis 102 towards the second segment 150 until the ends of the first segment 120 and second segment 150 are aligned. Hence the first segment 120 support structure 510 may be moved into the nested position within the second segment 150 support structure 520.

The first segment 120 is then moved in direction D perpendicular to, and towards the longitudinal axis 102 until the edges 122, 124 of the first segment 120 are located with the edges 132, 134 of the second segment 150.

That is to say, the first segment 120 is moved into position beneath the second segment 150 to avoid collision and damage to the segments 12, 150, and then raised into position (for example by being raised by the transport unit 512) to join the edges of the segments.

The first segment 120 is aligned with the second segment 150 by re-locating the first segment 120 in the gap 136 defined by the edges 132, 134 of the second segment 150.

Figure 22:
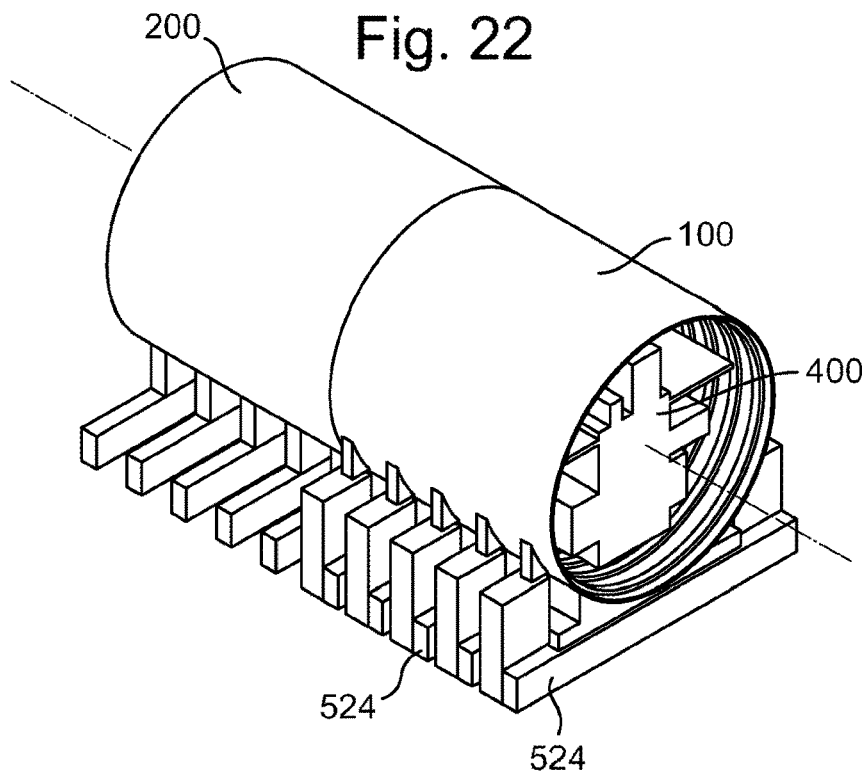
FIGS. 22, 23, 24 show a perspective view, end view and side view respectively of the sections and support structure of FIGS. 19, 20, 21 during a further stage of manufacture according to the present disclosure.
Figure 23:
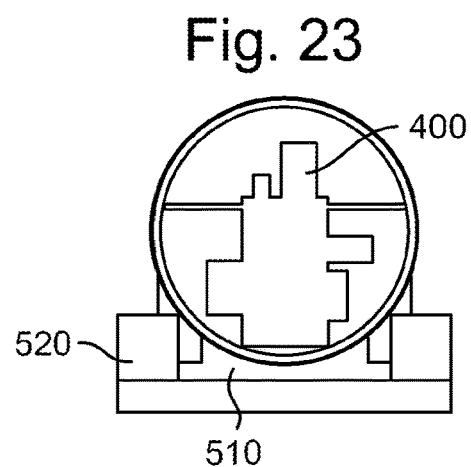
Figure 24:
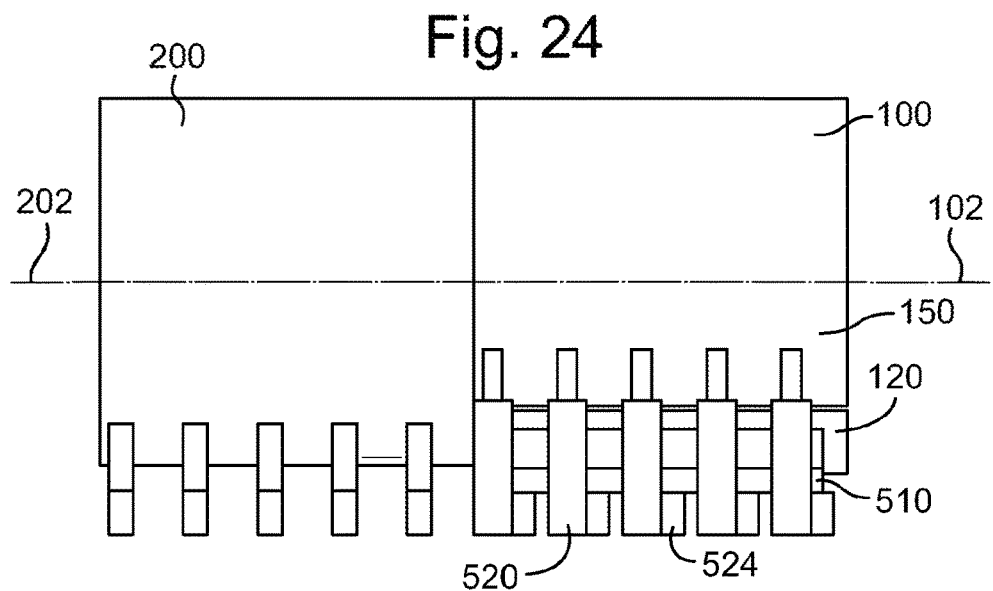

As shown in FIGS. 19, 20, 21, the transport unit 512 may then be separated from the support structure 510 so that the transverse beams 524 may be fitted to support structure 520, as shown in FIGS. 22, 23, 24.

Figure 25:
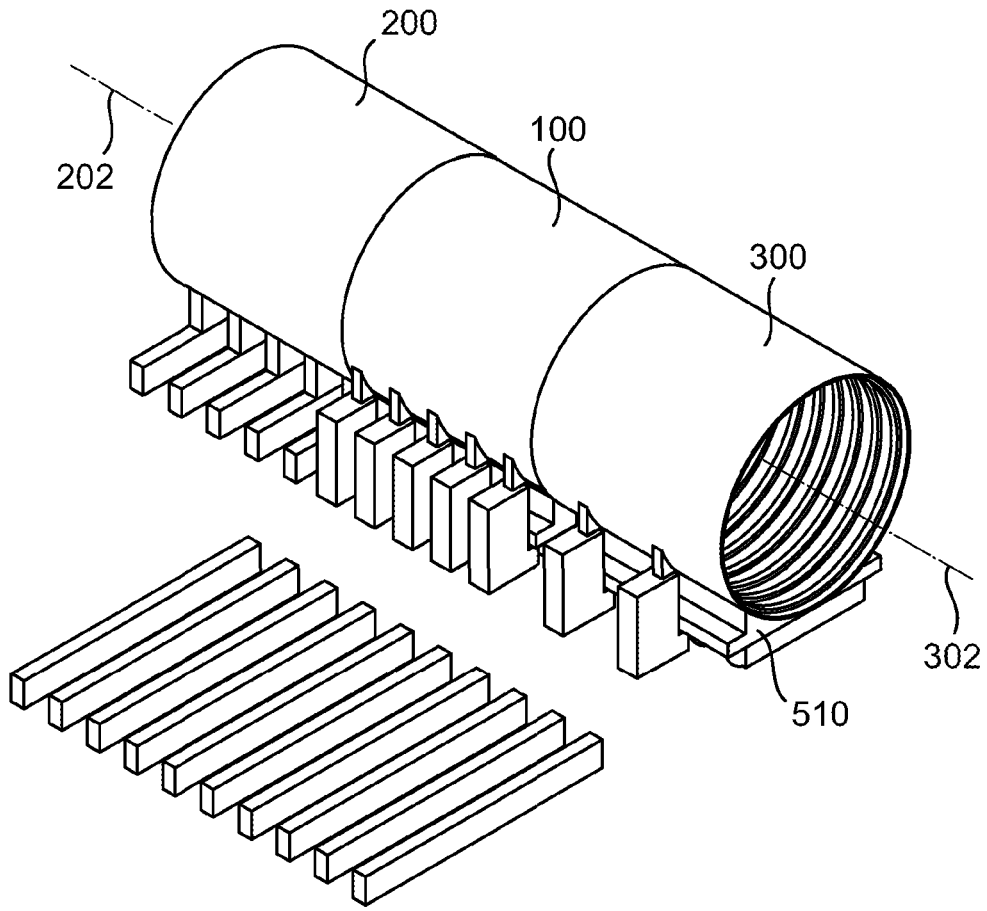
FIGS. 25, 26 show a perspective view and side view respectively of the sections and support structure of FIGS. 17, 18 during a further stage of manufacture according to the present disclosure.
Figure 26:
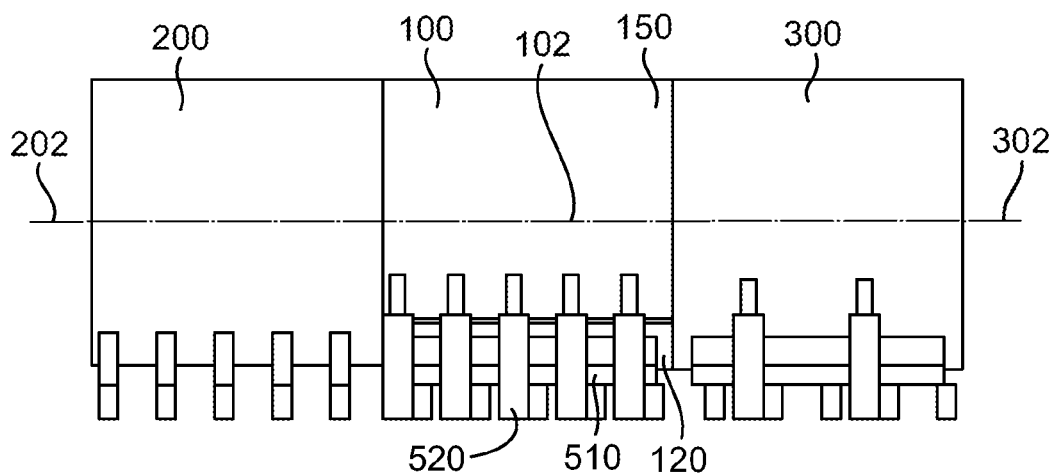

In examples in which the third section 300 is attached to the first section 100 before the segments are re-joined, as shown in FIGS. 25, 26, the third section 300 and first segment 120 are raised to the correct position, supported off their respective support structures, and then transverse beams 524 are added. Then the sections are aligned using the jacking system and fairing aids The joint between the first segment 120 and second segment 150 is then correctly aligned using a jacking system and fairing aids. That is to say, jacks may be used to support and orientate the support structure 510 in order to align the first segment 120 and second segment 150 correctly. Hence the first segment 120 is re-attached (e.g. by welding, bolting or fixing by some appropriate means) to the second segment 150 by re-locating the first segment 120 in the gap 136 defined by the edges 132, 134 of the second segment 150 and joining the first segment 120 and second segment 150 along their edges 122, 124; 132, 134 so the apparatus 400 is housed within the first sub-chamber 106.

Figure 27:
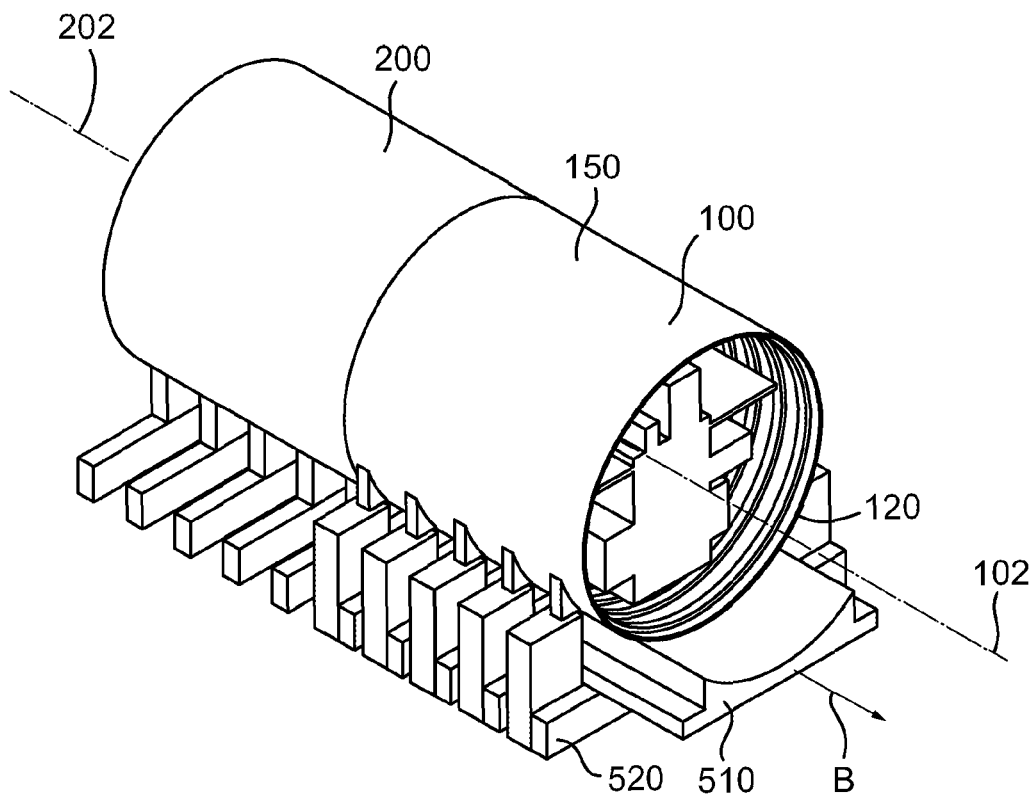
FIGS. 27, 28 show a perspective view and side view respectively of the sections and support structure of FIGS. 22, 23, 24 during a further stage of manufacture according to the present disclosure.
Figure 28:
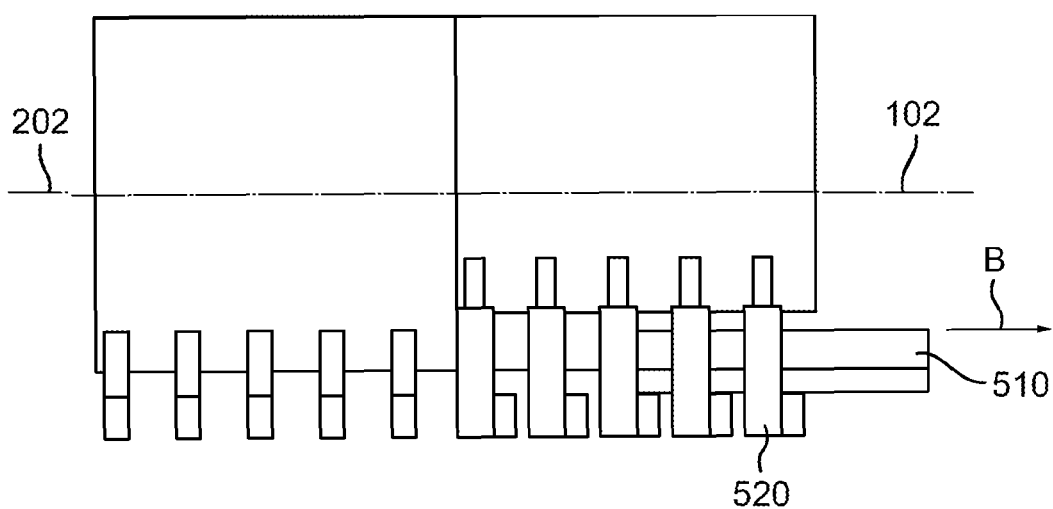
Figure 29:
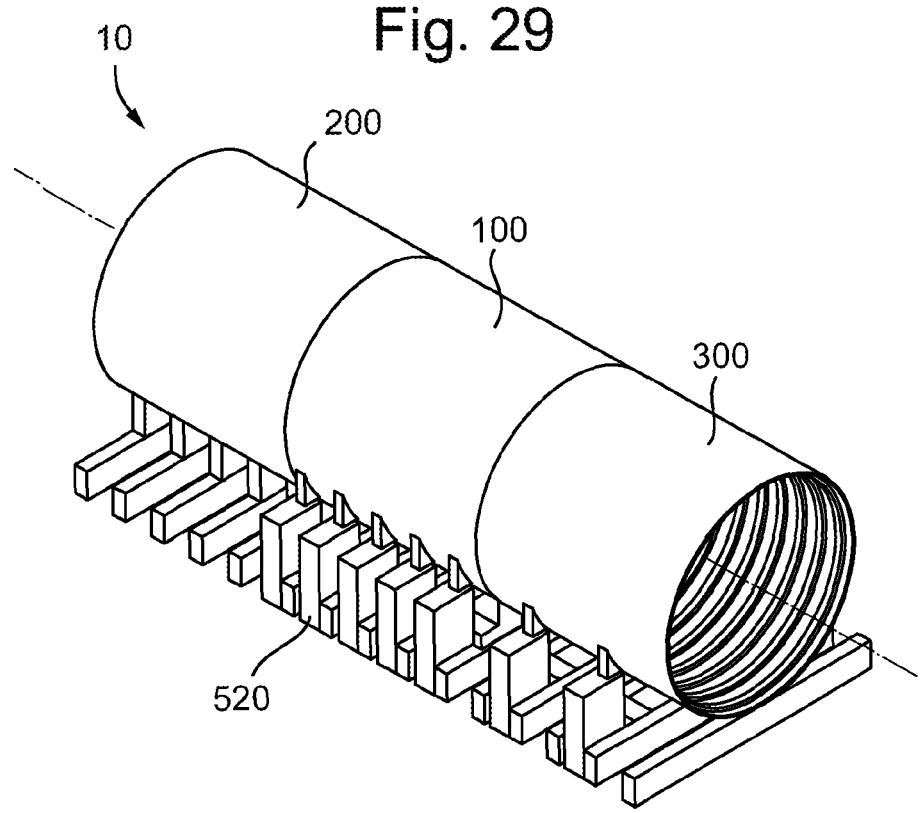
FIGS. 29, 30 show a perspective view and side view respectively of the sections and support structure of FIGS. 25, 26 during a further stage of manufacture according to the present disclosure.
Figure 30:
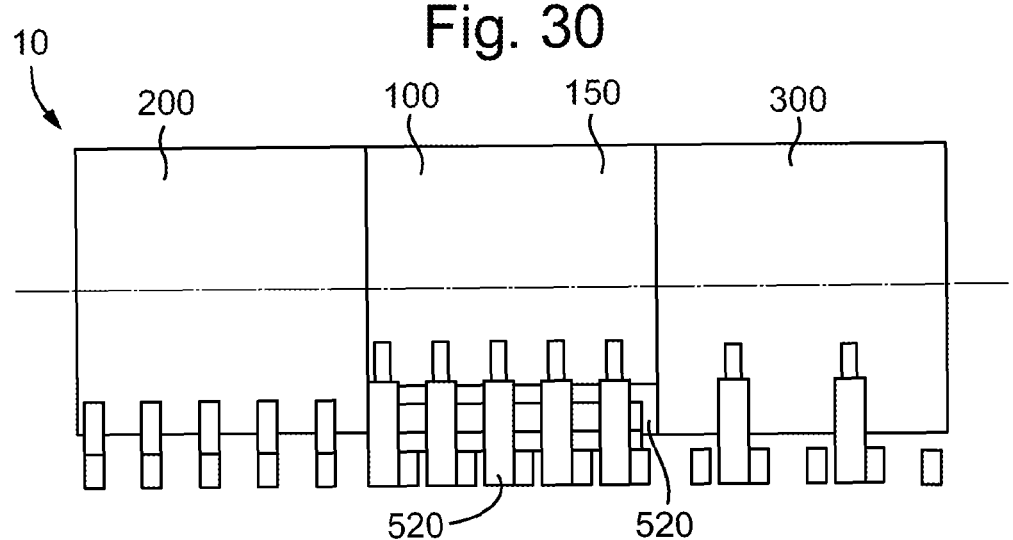

As shown in FIGS. 27, 28, once the segments 120, 150 are joined, the support structure 510 may be removed from under the first unit 100 (e.g. by moving in direction B).

Figure 31:
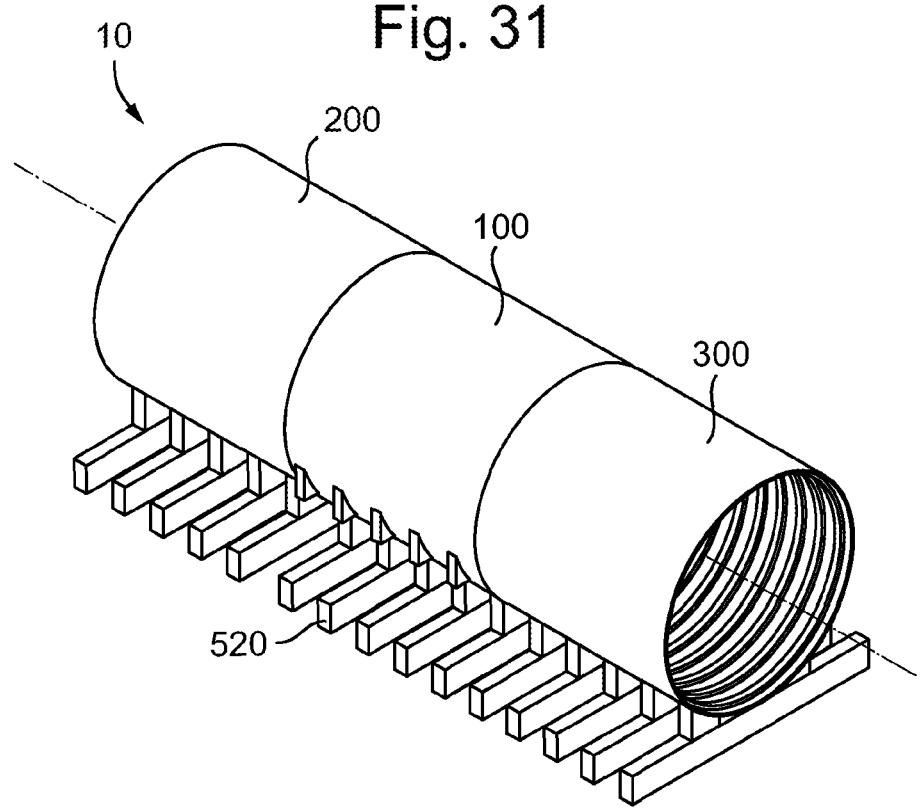
FIGS. 31, 32 show a perspective view and side view respectively of the sections and support structure of FIGS. 27, 28 during a further stage of manufacture according to the present disclosure.
Figure 32:
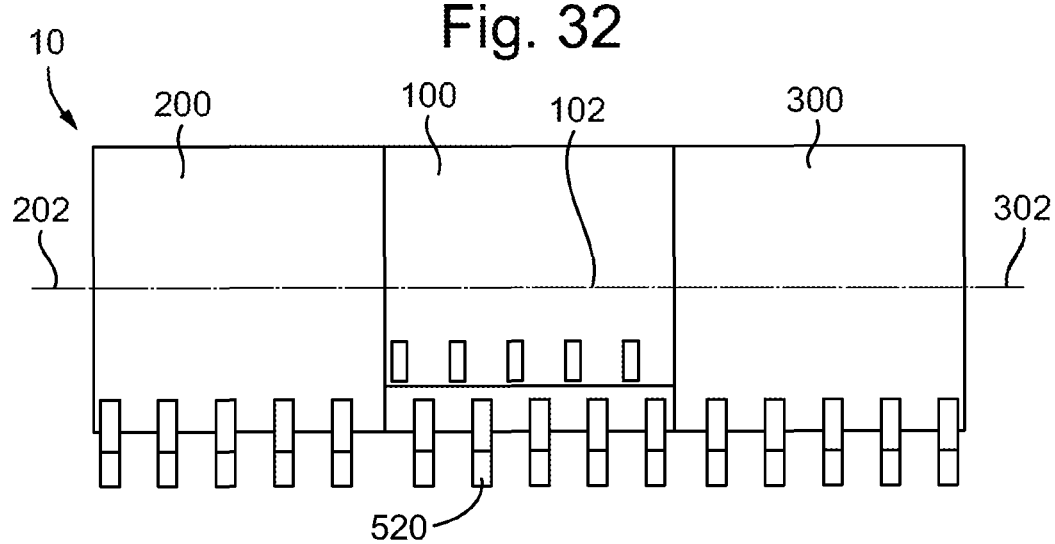
Figure 33:
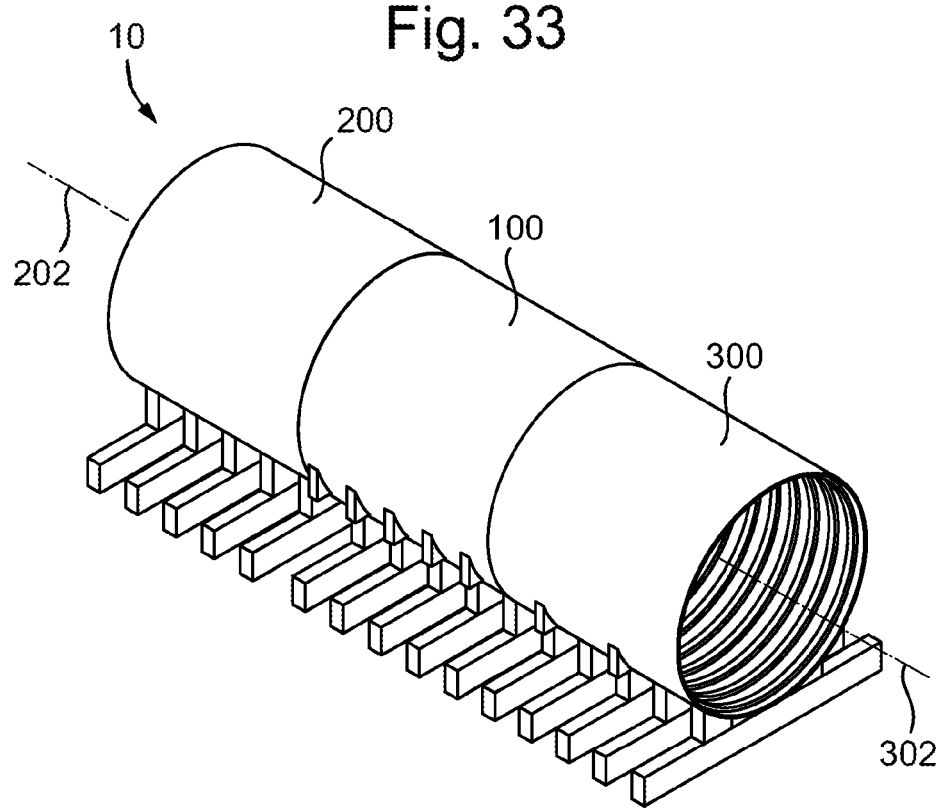
FIGS. 33, 34 show a perspective view and side view respectively of the pressure vessel and support structure of FIGS. 29, 30 during a further stage of manufacture according to the present disclosure.
Figure 34:
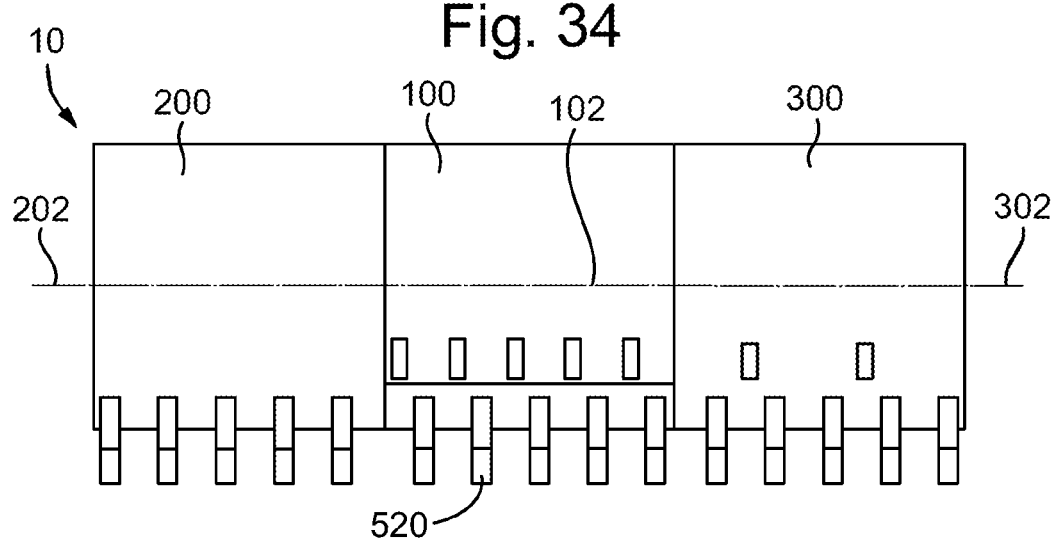

The support structure 520 may then be replaced and/or reconfigured for a further stage of manufacture (if required) for example by replacing temporary support stands with final blocking stools and removing temporary welded supports after the third section 300 has been attached, for example after the stage shown in FIG. 25, 26, as shown in FIGS. 29, 30, 33, 34 or after the stage shown in FIG. 27, 28, as shown in FIGS. 31, 32.

The method may comprise the addition of further sections akin to sections 100, 200, 300.

The first section 100, second section 200, third section 300 may be tubular (i.e. hollow) configured to have the same diameter and cross-sectional shape at their interface ends 108, 110, 208, 210, 308, 310. The joining of the first section 100, second section 200 and third section 300 links the sub-chambers 106, 206, 306 form a larger chamber.

By way of example the pressure vessel 10, first section 100, second section 200 and third section 300 which form the pressure vessel 10, are illustrated as having a cylindrical cross-section. However, the sections and final pressure vessel may have a cross-section with a different shape.

The pressure vessel may comprise a further structure constructed/provided around joined sections 100, 200, 300.

Hence there is provided a heavy engineering method of manufacture of a large pressure vessel which houses equipment (for example power units, tanks and/or internal housings), which method may be executed with reduced risk to operators, with greater accuracy and more quickly than examples of the related art.

In examples where the apparatus 500 is a machine (for example a powerplant of some kind) the method of the present disclosure enables the apparatus to be mounted as required to a segment of the pressure wall, and at least partly commissioned and checked in a suitable environment, with easy access to the apparatus and without any physical or health and safety constraints which are present once the apparatus is within the sub-chamber of the section and/or the pressure vessel chamber.

Since the first segment 120 is carried on s support structure 510, which may in turn be supported on a transport 512, the first segment 120 may be transported to any suitable location (i.e. where there is a crane of sufficient capacity for lifting the apparatus 500 onto the first segment 120) for the fitting of the apparatus 500. Since the apparatus is fitted to the first segment 120 when the first segment 120 is detached from the second segment 150, the apparatus may be lowered vertically down onto the first segment, using a crane of suitable capacity, thereby reducing risk of injury to personnel or damage to equipment.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A support structure for manufacturing a pressure vessel, the support structure configured to be carried on a supporting substrate, the support structure comprising:
   a first segment support structure nestable within, and moveable relative to, a second segment support structure;
   wherein the first segment support structure is configured to be raised and lowered relative to the second segment support structure to raise and lower the first segment support structure relative to the substrate;
   wherein the first segment support structure is configured to move in a direction parallel to a longitudinal axis of the pressure vessel between a nested position within side walls of the second segment support structure to a position spaced apart from the second segment support structure across a surface of the substrate; and
   wherein the pressure vessel is a submarine, and
   wherein the first segment support structure is supported by the second segment support structure while the first segment support structure is in the nested position within the side walls of the second segment support structure.

2. The support structure of claim 1, wherein the support structure is configured to support a first segment of the pressure vessel independently of a second segment of the pressure vessel.

3. The support structure of claim 2, wherein the pressure vessel comprises a section having a longitudinal axis, the section comprising a wall which extends around the longitudinal axis to define a boundary of a sub-chamber, the section having a first end spaced apart from a second end along the longitudinal axis, the section being open at the first end to define a first opening to the sub-chamber, the section being open at the second end to define a second opening to the sub-chamber, wherein the wall is divided into the first segment of the pressure vessel and the second segment of the pressure vessel, the first segment of the pressure vessel extending from the first end to the second end, and having edges extending from the first end to the second end, and wherein the second segment of the pressure vessel is provided with longitudinally extending edges extending from the first end to the second end, spaced apart by a gap.

4. The support structure of claim 1, wherein the first segment support structure is configured to be slidable along a surface of the substrate.

5. The support structure of claim 1, further comprising a transport unit, wherein the transport unit is configured to carry the first segment support structure and is movable along and/or across the substrate.

6. The support structure of claim 5, wherein the transport unit is operable to raise and lower the first segment support structure relative to the substrate.

7. The support structure of claim 1, further comprising one or more jacks configured to raise and lower the first segment support structure relative to the substrate.

8. The support structure of claim 1, wherein the second segment support structure includes inwardly facing shoulders for supporting the first segment support structure.

9. The support structure of claim 1, wherein the first segment support structure is a solid block.

10. The support structure of claim 3, wherein the first segment support structure includes a series of arched plates spaced apart along a length of the first segment of the pressure vessel.

11. The support structure of claim 1, wherein the second segment support structure includes a plurality of support members.

12. The support structure of claim 11, further comprising one or more support beams for joining the support members.

13. A method of manufacturing a pressure vessel comprising a section having a longitudinal axis, the section comprising a wall which extends around the longitudinal axis to define the boundary of a first sub-chamber, the section having a first end spaced apart from a second end along the longitudinal axis, the section being open at the first end to define a first opening to the first sub-chamber; the section being open at the second end to define a second opening to the first sub-chamber, wherein the pressure vessel is a submarine, the method comprising:
   supporting the wall with a support structure, the support structure comprising a first segment support structure and a second segment support structure, the first segment support structure nestable within, and moveable relative to, the second segment support structure, wherein the first segment support structure is configured to be raised and lowered relative to the second segment support structure to raise and lower the first segment support structure relative to a supporting substrate, the first segment support structure configured to move in a direction parallel to a longitudinal axis of the pressure vessel between a nested position within side walls of the second segment support structure to a position spaced apart from the second segment support structure across a surface of the substrate,
   wherein the first segment support structure is supported by the second segment support structure while the first segment support structure is in the nested position within the side walls of the second segment support structure.

14. The method of claim 13, further comprising supporting the first segment support structure with the second segment support structure.

15. The method of claim 13, further comprising supporting the first segment support structure with a transport unit and/or one or more jacks.

16. The method of claim 13, further comprising:
   dividing the wall into a first segment and a second segment, the first segment of the wall extending from the first end to the second end and having edges extending from the first end to the second end, the first segment being supported by the first segment support structure and the second segment being supported by the second segment support structure;
   separating, using the support structure, the first segment from the second segment such that second segment of the wall is provided with longitudinally extending edges extending from the first end to the second end, spaced apart by a gap;
   fitting apparatus onto the first segment; and
   re-attaching the first segment and the second segment by re-locating, using the support structure, the first segment in the gap defined by the edges of the second segment and joining the first segment and second segment along their edges so the apparatus is housed within the first sub-chamber.

17. The method of claim 16, wherein separating the first segment from the second segment includes:

first lowering the first segment support structure relative to the second segment support structure to move the first segment in a direction perpendicular to, and away from, the longitudinal axis until the edges of the first segment are spaced apart from the edges of the second segment; and subsequently moving the first segment support structure along a surface of the substrate to move the first segment in direction parallel to the longitudinal axis away from the second segment, and wherein re-attaching the first segment and second segment includes:

moving the first segment support structure along a surface of the substrate to move the first segment in direction parallel to the longitudinal axis towards the second segment until ends of the first segment and the second segment are aligned; and subsequently raising the first segment support structure relative to the second segment support structure to move the first segment in a direction perpendicular to, and towards the longitudinal axis until the edges of the first segment are located with the edges of the second segment.

18. A support structure comprising a first segment support structure nestable within, and moveable relative to, a second segment support structure, the support structure being configured to support a first segment of a submarine independently of a second segment of the submarine, the first segment support structure configured to support the first segment and the second segment support structure configured to support the second segment, wherein the first segment support structure is configured to move in a direction parallel to a longitudinal axis of the submarine between a nested position within side walls of the second segment support structure to a position spaced apart from the second segment support structure across a surface of a substrate; and wherein the first segment support structure is supported by the second segment support structure while the first segment support structure is in the nested position within the side walls of the second segment support structure.

* * * * *